US006561734B1

(12) United States Patent
Allen et al.

(10) Patent No.: US 6,561,734 B1
(45) Date of Patent: May 13, 2003

(54) PARTIAL HELICAL STRAKE FOR VORTEX-INDUCED-VIBRATION SUPPRESSION

(75) Inventors: Donald Wayne Allen, Houston, TX (US); Dean Leroy Henning, Needville, TX (US); Joe Henry Haws, Richmond, TX (US); David Wayne McMillan, Deer Park, TX (US); Richard Bruce McDaniel, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/564,497

(22) Filed: May 4, 2000

Related U.S. Application Data
(60) Provisional application No. 60/133,235, filed on May 7, 1999.

(51) Int. Cl.[7] .................................................. F16L 1/04
(52) U.S. Cl. ........................ 405/216; 405/211; 114/243
(58) Field of Search ............................ 405/195.1, 211, 405/211.1, 212–216; 114/243; 174/42, 108; 138/178, 106, 122, 110, 129, 150, 154; 248/62, 63, 74.1, 74.2; 294/102.1, 102.2

(56) References Cited

U.S. PATENT DOCUMENTS

| 3,454,051 A | * | 7/1969 | Goepfert et al. ............ 138/178 |
| 4,436,266 A | * | 3/1984 | Gerding ...................... 248/74.1 |
| 4,648,745 A |   | 3/1987 | Hulsbergen ................. 405/159 |

FOREIGN PATENT DOCUMENTS

| FR | 2367148 |   | 9/1978 |
| GB | 2334062 |   | 8/1999 |
| GB | 2335248 |   | 9/1999 |
| WO | 95/27101 |   | 10/1995 |
| WO | 98/19018 | * | 5/1998 |
| WO | 00/61433 | * | 10/2000 |

OTHER PUBLICATIONS

Journal of the Waterways, Harbors and Coastal Engineering Division, "Forces Due to Waves on Submerged Structures", John B. Herbich, M. ASCE and George E. Shank, Feb. 1971, pp. 57–71.
Journal of the Engineering Mechanics Division, Suppression of the Fluid–Induced Vibration of Circular Cylinders, Peter Price, Jul., 1956, pp. 1030–1–1030–22.
Behavior of Offshore Structure, "Wave Loads on Pipelines on the Seafloor", H. Lundgren, B. Mathiesen, H. Gravesen, 1976, pp. 236–247.
"On–Bottom Pipeline Stability in Steady Water Currents", W. T. Jones, Shell Development Co. Mar., 1978, pp. 475–484.
"Formation and Reversal of Vortices Around Circular Cylinders Subjected to Water Waves", Momchilo M. Zdravkovich and John E. Namork, Aug. 1977, pp. 378–383.
Strumming Suppression–An Annotated Bibilography, B. E. Hafen, D. J. Meggitt, and F. C. Liu, Oct. 1976, U. S. Department of Commerce.
"Some–Recent Studies of Vortex Shedding With Application to Marine Tubulars and Risers", O. M. Griffin and S. E.Ramberg, vol. 104, Mar. 1982, pp. 2–13.
OTC 4667, "Stimulated Self–Burial of Submarine Pipelines", by C. H. Hulsbergen, pp. 171–178.
OTC 5339, "Spoilers for Stimulated Self–Burial of Submarine Pipelines", by C. H. Hulsbergen, pp. 441–444.
Thermal Aspects of Trenching, Burial and Covering of Hot Submarine Pipelines, S. Boer and C. H. Hulsbergen, pp. 39–52.

(List continued on next page.)

Primary Examiner—David Bagnell
Assistant Examiner—Sunil Singh

(57) ABSTRACT

A partial helical strake system and method for suppressing vortex-induced-vibration of a substantially cylindrical marine element, the strake system having a base connected to the cylindrical marine element and an array of helical strakes projecting from the base for about half or less of the circumference of the cylindrical marine element.

12 Claims, 4 Drawing Sheets

OTHER PUBLICATIONS

OTC 6154, "Effect of Spoilers on Submarines Pipeline Stability", by C. H. Hulsbergen and R. Bijker, pp. 337–350.

"Drag and Lift Forces on a Submarine Pipeline Subjected to a Transverse Horizontal Current", R. J. Brown, Society of Petroleum Engineers Journal, pp. 254–260.

Journal of Wind Engineering and Industrial Aerodynamics, "Review and Classification of Various Aerodynamic and Hydrodynamic Means for Suppressing Vortex Shedding", M. M. Zdravkovich, 1981, v. 6–7, pp. 145–189.

* cited by examiner

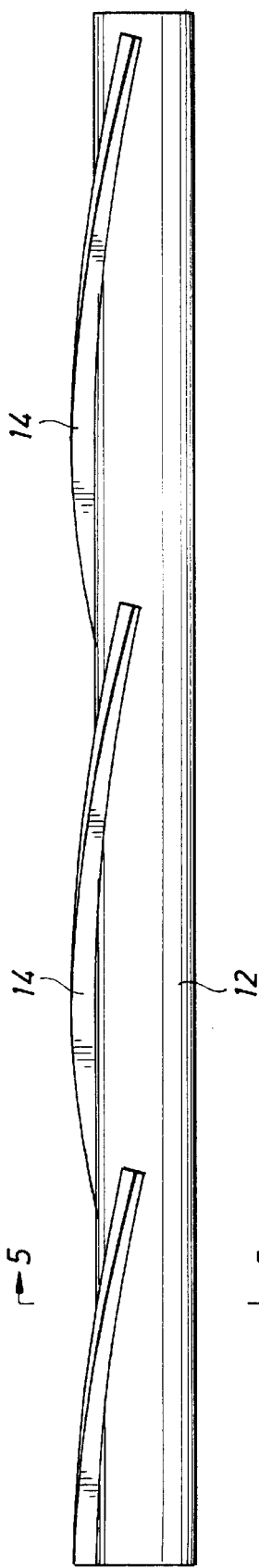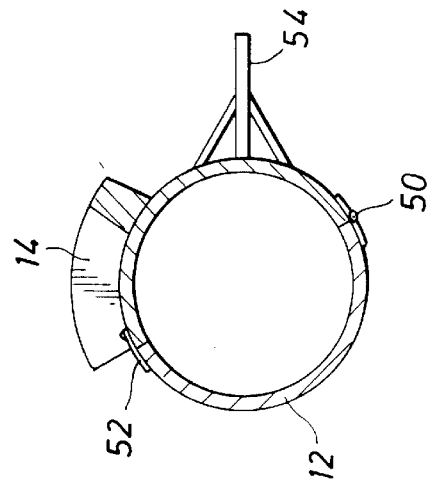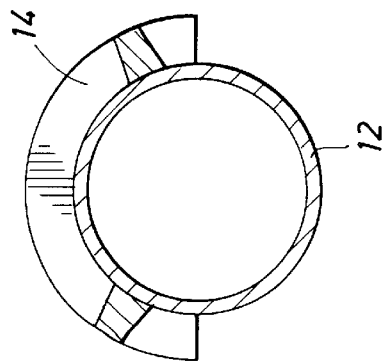

PARTIAL HELICAL STRAKE FOR VORTEX-INDUCED-VIBRATIONSUPPRESSION

This application claims the benefit of U.S. Provisional Application No. 60/133,235 filed May 7, 1999, the entire disclosure of which is hereby incorporated by reference

BACKGROUND

The present invention relates to a method and apparatus for reducing vortex-induced-vibrations ("VIV") and, more particularly, reducing VIV in marine environments by the use of helical strakes.

Production of oil and gas from offshore fields has created many unique engineering challenges. One of these challenges is dealing with effects of currents on fixed cylindrical marine elements. Such marine elements are employed in a variety of applications, including, e.g., subsea pipelines; drilling, production, import and export risers; tendons for tension leg platforms; legs for traditional fixed and for compliant platforms; other mooring elements for deepwater platforms; and, although not conventionally thought of as such, the hull structure for spar type structures. These currents cause vortexes to shed from the sides of the marine elements, inducing vibrations that can lead to the failure of the marine elements or their supports.

For short cylindrical elements that are adjacent convenient means for secure mounting, the marine elements and their supports can be made strong enough to resist significant movement by the forces created by vortex shedding. Alternatively, the marine element could be braced to change the frequency at which the element would be excited by vortex shedding.

However, strengthening or bracing becomes impractical when the application requires that the unsupported segments of marine element extend for long runs. Deepwater production risers, drilling risers, platform export risers, import risers bringing in production from satellite wells, tendons for tension leg platforms, and other conduits for produced fluids and deepwater mooring elements formed from tubular goods are typical of such applications. These pipes and tubular goods serve as marine elements in applications that are difficult or impossible to brace sufficiently to satisfactorily control vibration induced by vortex shedding. Subsea pipelines traversing valleys on the ocean floor for extended, unsupported lengths and spar hulls moored at the end of long tethers and/or mooring lines provide additional examples.

Some applications, e.g., unsupported spans of subsea pipelines, present additional challenges to deployment with onshore fabrication or topside deployment of devices for VIV suppression. In such applications it may be desirable to install the VIV suppression devices after the pipeline is layed, substantially complicating and reducing deployment options.

However, drawbacks of strakes for VIV suppression are that they have been thought to be effective only if they fully cover the circumference cylindrical structure, increasing weight and material requirements, creating handling difficulties in avoiding damaging strakes on all sides, and materially increasing the drag on the marine element.

SUMMARY OF THE INVENTION

The present invention is a partial helical strake system and method for suppressing vortex-induced vibration of a substantially cylindrical marine element, the strake system having a base connected to the cylindrical structure and an array of helical strakes projecting from the base for about half or less of the circumference of the cylindrical structure.

BRIEF DESCRIPTION OF THE DRAWINGS

The brief description above, as well as further objects and advantages of the present invention, will be more fully appreciated by reference to the following detailed description of the preferred embodiments, which should be read in conjunction with the accompanying drawings in which:

FIG. 4 is a side elevational view of an alternate embodiment of a partial helical strake in accordance with the present invention;

FIG. 5 is a transverse cross sectional view of the partial helical strake of FIG. 4, taken at line 5—5 in FIG. 4; and FIG. 6 is a transverse cross section of an alternate embodiment of a partial helical strake constructed in accordance with the present invention.

A DETAILED DESCRIPTION OF ILLUSTRATIVE EMBODIMENTS

Figure 1:
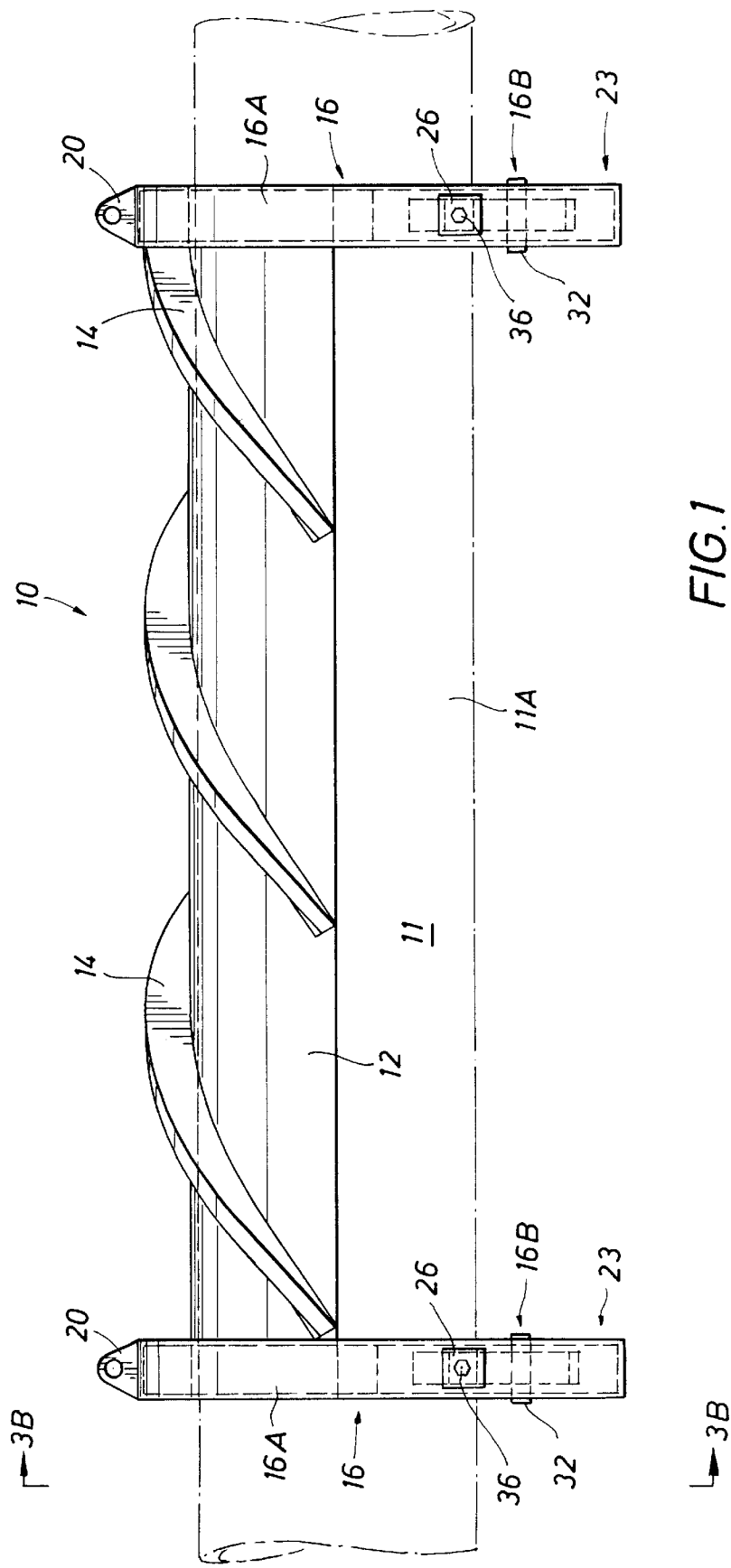
FIG. 1 is a side elevational view of a partial helical strake in accordance with one embodiment of the present invention deployed on a cylindrical marine element.
Figure 2:
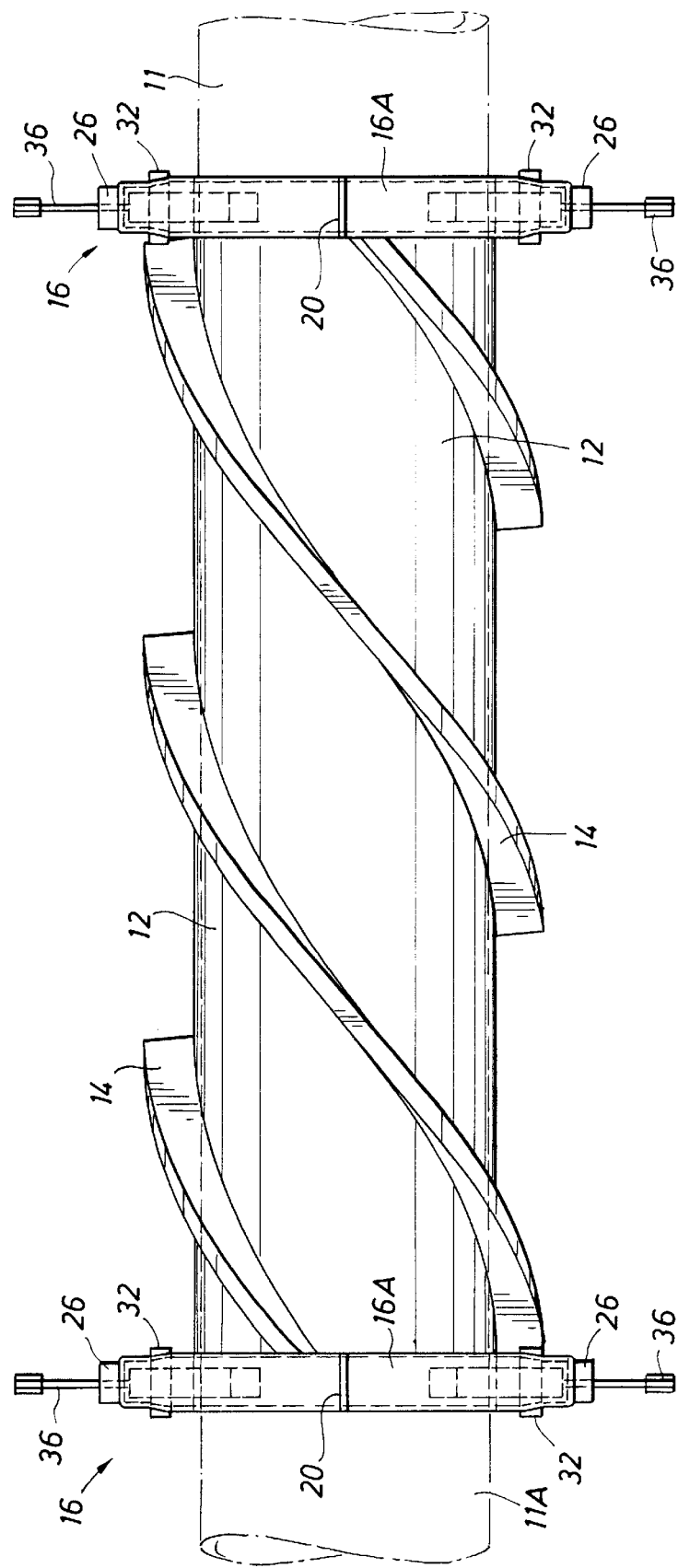
FIG. 2 is a top elevational view of the partial helical strake of FIG. 1 deployed on a cylindrical marine element.
Figure 3A:
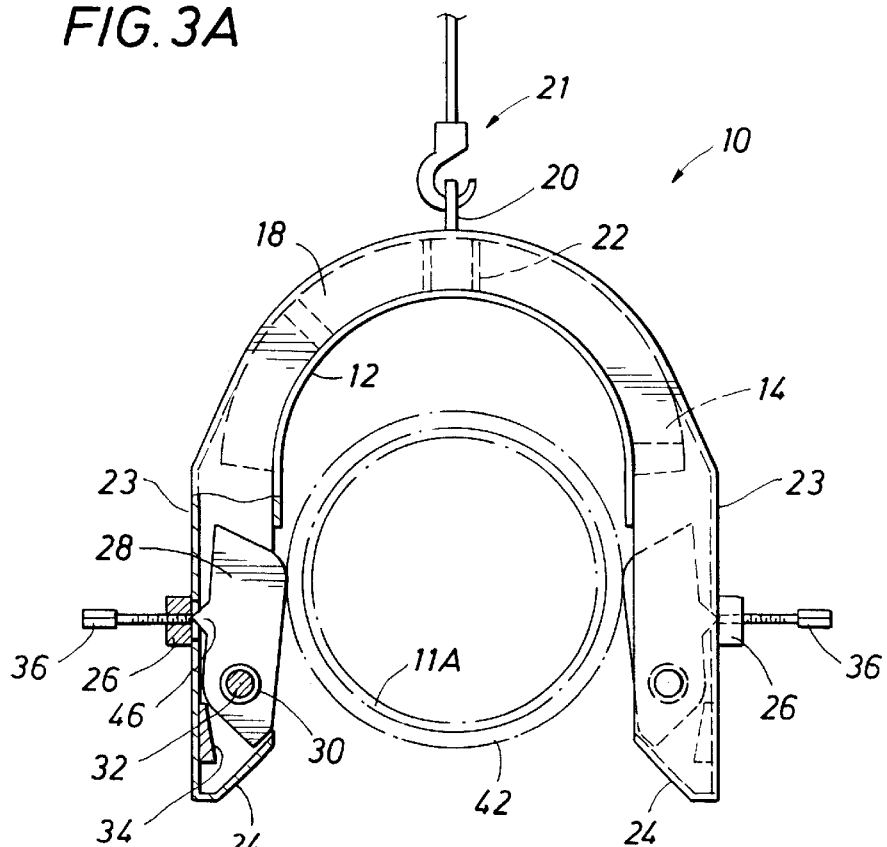
FIG. 3A is a transversely taken cross sectional view of a cylindrical marine element with a partial helical strake in accordance with the embodiment of FIG. 1 in the process of being installed.
Figure 3B:
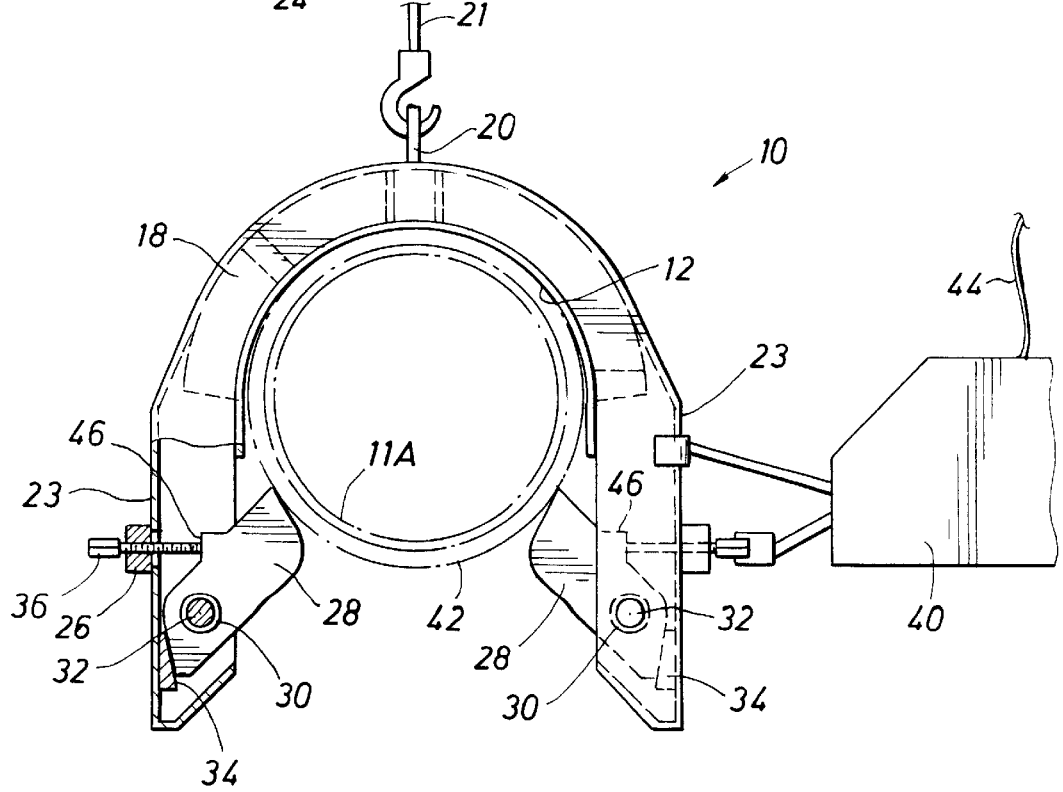
FIG. 3B is a transversely taken cross sectional view taken at line 3B—3B of FIG. 1 of a cylindrical marine element with the partial helical strake of FIG. 3A, installed.

FIG. 1 is a side elevational view of a partial helical strake system 10 secured about substantially cylindrical marine element 11. Cylindrical element or structure 11 generically illustrates riser, tendon, spar hull, subsea pipeline and other marine applications of cylindrical structures having significant unsupported spans which are subjected to current influences. For the proposes of further discussions of FIGS. 1–3B as an illustrative embodiment of the present invention, cylindrical element 11 will be discussed as subsea pipeline 11A. See also the overhead view of FIG. 2.

Absent partial helical strake system 10, an unsupported span of subsea pipeline 11A that traverses an underwater trench or between two high points on the seafloor could be caused to fail in the long term presence of current passing across the pipeline. Such current passing the sides of the cylindrical marine element would tend to shed vortexes, inducing vibrations and adversely affecting the fatigue life of the pipeline. Failure risks are exacerbated if the vibration drives the unsupported cylindrical element near its natural harmonic frequency.

However, partial helical strake system 10 serves to disrupt the correlation of the flow about cylindrical structure 11 so as to markedly reduce vortex shedding and the attendant VIV problems. Partial helical strake 10 has a base 12 from which a plurality of partial helical strakes 14 project. Surprisingly, such partial helical strakes have been found effective though covering only a small portion of the circumference of cylindrical structure 11, e.g., 20–50%. This can substantially reduce the material cost for VIV reduction, but can also be instrumental in facilitating post deployment installation such as on an unsupported span of subsea pipeline 11A already layed on the ocean floor. Further such partial strakes are lighter, use less material, and can produce less drag than the conventional, full cicumferential strakes.

In this embodiment, base 12 and partial helical strakes 14 are formed of a lightweight, non-corrosive material such as fiberglass and the ends of base section 12 are secured about subsea pipeline 11A with connectors 16, here clamps 16A.

The features and operation of clamps 16A are illustrated in FIGS. 1–3B. Stiffeners or gussets 22 provide additional stability to u-shaped fiberglass clamp housing 18, which receives base 12 and extends downwardly arms 23 terminating in guide edges 24. Pad eyes 20 are provided at the apex of clamp housing 18. Arms 23 are provided with bolt blocks 26 with bonded nuts inside threadingly engaging lock bolts 36. Fiberglass dogs 28 are also mounted inside arms 23, pivotally secured with hinge pins 32 formed from solid or heavy wall tubing. Spacers 30 of DELRIN or nylon facilitate the free rotation of dogs 28. A stop wedge 34 is positioned within arm 23 to receive dog 28.

For installation on a substantially horizontal subsea pipeline 11A, partial helical strake system 10 is lowered by hook and line 21 engaging pad eyes 20 provided at the top of clamp housing 18. See FIG. 3A. The partial helical strake system 10 may be guided by divers in shallower water or remotely operated vehicle ("ROV") 40 having a video feed to the surface through umbilical 44. See FIG. 3B. The pipeline 11A is covered with a corrosion inhibiting and possibly thermally insulative pipe coating 42. Guide edges 24 center the strake system over the pipe and further lowering causes freely rotating dogs 28 to retract until base 12 seats on pipeline 11A. See FIG. 3B.

Once base 12 lands on the pipeline, dogs 28 drop toward engaging position and diver or ROV 44 advance lock bolts 36 to engage dogs 28 at shoulder 46, driving and securing the dogs in locked position, backed into stop wedge 34. In the locked position, dogs 28 hold the lightweight partial helical strake securely to the subsea pipeline despite the current loads. Hook and line 21 can be removed and retrieved to surface.

FIGS. 4–6 illustrate alternative embodiments of the present invention. FIGS. 4 and 5 mount partial strakes 14 on a fully circumferencial base 12. Here the base may be the marine cylindrical structure 11 itself or may be endwise-receivedthereover before deployment into the marine environment.

FIG. 6 illustrates an even shorter partial helical strake 14, here addressing about 20% of the circumference as opposed to the 50% of FIG. 5. FIG. 6 also illustrates a hinge 50 and latch 52 in base 12 for securing the partial helical strake system 10 about the outside of the cylindrical structure, not shown.

Partial strakes 14 are directional and their efficiency can be affected by orientation to the current. The hinge and latch system embodiment of FIG. 6 can be loosely fitted and also provided with a weathervaning tail 54 to orient the straked array for optimum effectiveness at 90 degrees to the current. Another approach to address variability in current headings is to provide a number of fixed arrays of partial helical strakes at different orientations along the length of the cylindrical structure. Although helical strakes might, in the aggregate, surround the circumference of the cylindrical structure, each array would be limited to about half or less of the circumference straked in each section protected by the present invention.

Although the illustrative embodiment described in detail is a subsea pipeline, those skilled in the art and provided with this disclosure could readily practice the invention across a full range of other cylindrical marine elements, including, but not limited to subsea pipelines; drilling, import and export risers; tendons for tension leg platforms; legs for traditional fixed and for compliant platforms; cables and other mooring elements for deepwater platforms; and, although not conventionally thought of as such, the hull structure for spar type structures.

Other modifications, changes, and substitutions are also intended in the foregoing disclosure. Further, in some instances, some features of the present invention will be employed without a corresponding use of other features described in these illustrative embodiments. Accordingly, it is appropriate that the appended claims be construed broadly and in a manner consistent with the spirit and scope of the invention herein.

What is claimed is:

1. A strake system for suppressing vortex induced vibration on a cylindrical structure deployed in marine applications consisting of:

a base connected to the cylindrical structure; and an array of helical strakes projecting from the base, wherein the helical strakes cover half or less of the circumference of the cylindrical structure.

2. A partial helical strake in accordance with claim 1 wherein the array of helical strakes projects from the base for 20–50 percent of the circumference of the cylindrical structure.

3. A partial helical strake in accordance with claim 2 wherein the base is integrally formed with the cylindrical structure.

4. A partial helical strake in accordance with claim 2 wherein the base, further comprising a clamp attached to each end of the base, the clamp comprising:

a u-shaped clamp housing attached to each end of the base oriented with the opening of the u-shaped clamp housing corresponding to that portion of the cylindrical structure not covered by the base;

arms extending out from the u-shaped clamp housing; and retaining latches mounted to the arms for engaging the cylindrical structure.

5. A partial helical strake in accordance with claim 4 wherein each retaining latch comprises:

a dog pivotally mounted within the arm, the dog configured to retract to pass over the cylindrical structure and to drop into place when the base is in position against the cylindrical structure;

a bolt block on the arm;

a lock bolt threadingly engaging the bolt block; and a shoulder on the dog receiving the lock bolt to secure the dog in position engaging the clamp about the cylindrical structure.

6. A partial helical strake in accordance with claim 5 further comprising:

reinforcing gussets in the clamp housing;

a pad eye connected to the apex of the clamp housing; and a guide edge on the end of each of the arms.

7. A method of reducing vortex induced vibration in marine cylindrical structures subjected to current environments, said method consisting of:

providing a base attached to the marine cylindrical structure; and projecting an array of helical strakes from the base for about half or less of the circumference of the marine cylindrical structure.

8. A method for reducing vortex induced vibration in an existing subsea pipeline, the method comprising:

(a) providing a strake system to be mounted on the subsea pipeline, the strake system comprised of:
   a base adapted to be fitted to the subsea pipeline, the base further being adapted to cover half or less of the pipeline; and
   A an array of helical strakes projecting from the base, the effective coverage of the helical strakes being half or less of the circumference of the subsea pipeline;
(b) lowering the strake system to rest atop the subsea pipeline; and
(c) securing the strake system to the subsea pipeline.

9. The method of claim 8, further comprising:
(a) providing a u-shaped clamp attached to each end of the base, each u-shaped clamp having legs extending away from the base; and
(b) providing selectively activated latches of the legs to secure the clamp and base to the subsea pipeline.

10. A partial helical strake system for suppressing vortex induced vibration on a cylindrical structure deployed in marine applications consisting of:

(a) a based connected to the structure; and
(b) at least one helical strake projecting from the base, wherein the effective coverage of the helical strake is half or less of the circumference of the cylindrical structure.

11. The partial helical strake of claim 10, wherein the effective coverage of the helical strake is 20–50 percent of the circumference of the clindrical structure.

12. The partial helical strake of claim 10, further including a clamp attached to each end of the base, the clamp comprising:
(a) a u-shaped clamp housing attached to each end of the base oriented with the opening of the u-shaped clamp housing corresponding to that portion of the cylindrical structure not covered by the base;
(b) arms extending out from the unshaped clamp housing; and
(c) retaining latches mounted to the arms for engaging the cylindrical structure.

\* \* \* \* \*